Inventor
LATHAM V. S. BLACKER
By
Attorney

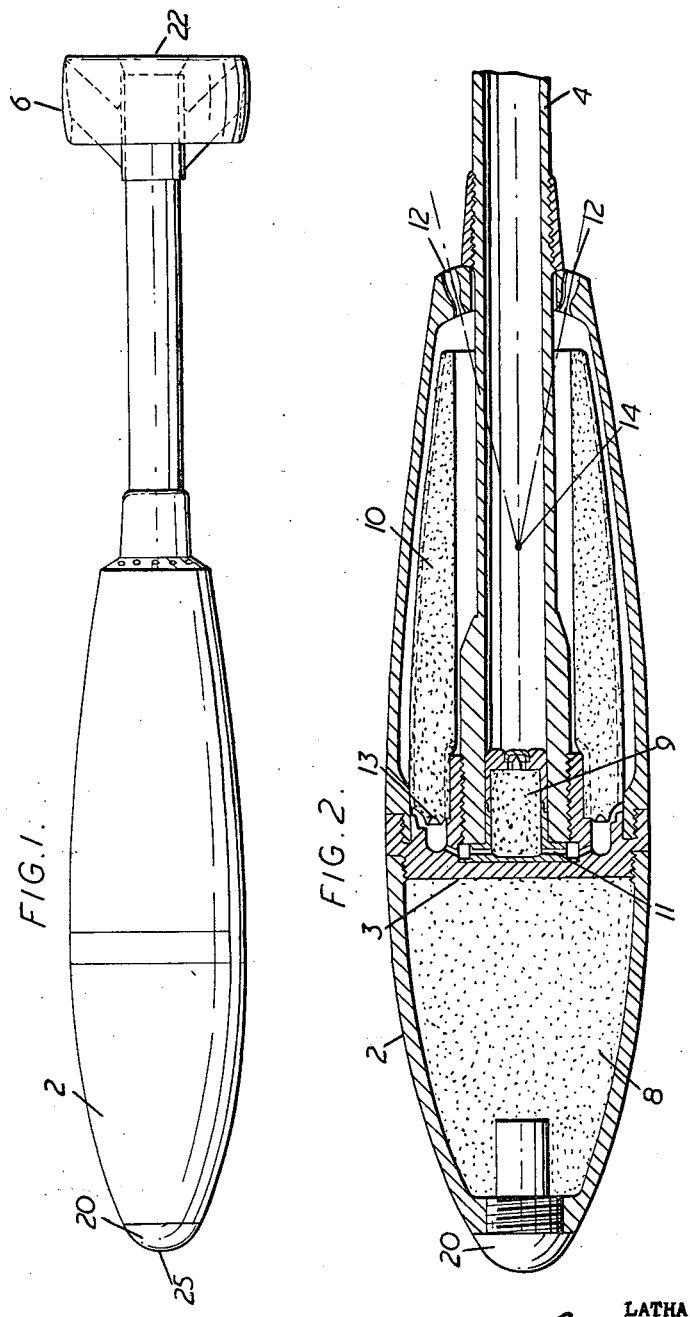

Nov. 7, 1961 L. V. S. BLACKER 3,007,410
REACTION-PROPELLED AERIAL AND OTHER BODIES
Filed June 12, 1958 3 Sheets-Sheet 3

Inventor
LATHAM V. S. BLACKER
By
Attorney

United States Patent Office 3,007,410
Patented Nov. 7, 1961

---

3,007,410
REACTION-PROPELLED AERIAL AND OTHER BODIES
Latham Valentine Stewart Blacker, Coldhayes, Liss, England
Filed June 12, 1958, Ser. No. 741,605
Claims priority, application Great Britain Oct. 4, 1950
3 Claims. (Cl. 102—49)

This invention relates to aerial missiles and other bodies of the kind which while travelling through air or other fluid are propelled by the reaction from the rearward discharge of fluid. The invention is particularly applicable to, and will be described in connection with, aerial missiles of this kind propelled by discharge of gas, but it will be clear that it is analogously applicable to other aerial bodies, submarine bodies, and bodies propelled by discharge of liquid.

This application is a continuation-in-part of Serial No. 248,799 filed on Sept. 28, 1951 and Serial No. 372,871 filed on Aug. 7, 1953, both applications entitled Reaction-Propelled Aerial And Other Bodies and now abandoned.

If a body of this kind is not provided with some form of directional control, the path taken by it is determined by the manner in which it is launched, the manner in which the gas is discharged, the shape of the body and the distribution of its mass, and any disturbances in the air. Disregarding disturbances in the air, it should ideally be possible to launch a succession of identical bodies in an identical manner and thus cause all the bodies to reach the same point. In practice, however, it is impossible to make a number of bodies absolutely identical with one another, nor will apparently identical bodies behave in exactly the same way. In particular, the direction of discharge of gas in relation to the body, and also the rate of discharge, vary from what is designed and, hence, vary from one body to another. My object in the present invention is to ensure that small inaccuracies either in actual construction or in gas discharge have only a very small or negligible effect on the desired path of a body. My invention is also applicable to bodies provided with directional control since it is undesirable to have to use the control to counteract inaccuracies as well as to steer the body.

The missiles with which the invention is primarily concerned are launched from a form of gun with an initial velocity and are assisted during at least some part of their travel by rocket propulsion. Such missiles must be simple and immune from interference, and accordingly, no form of gyroscopic or remote directional control is desirable. The missile usually consists of a head, a tail member, and a stabilizer on the end of the tail. Hitherto, in practical missiles of this kind, gas for propulsion has usually been discharged from the end of the tail, and this has been a cause of inaccurate performance, principally because a slight inaccuracy in the direction of discharge causes the reaction thrust to apply a substantial turning moment to the body.

It has been proposed in United States Patent No. 2,503,271 to discharge gas from a rocket along paths which diverge rearwardly from one another about the longitudinal axis of the rocket and leave the rocket at a substantial distance in front of its rear end. In this proposal, however, the point (which may be called the point of convergence) at which the diverging paths meet when extended forwardly is coincident with the centre of gravity of the rocket.

Researches which I have made have shown that, to ensure that small inaccuracies have a very small or negligible effect, it is necessary not only to discharge the gases in streams which diverge substantially symmetrically from a point at a substantial distance in front of the rear end, but also to select that point of convergence with reference to a point which I will call the turning point. This is the point through which any oblique propulsive force must act if it is to impart linear motion to the body including a transverse component but unaccompanied by angular motion about a transverse axis. The turning point cannot be directly determined by any test with the body at rest, since its location is variable depending on the propulsive force and the speed of the body.

It is, however, possible to determine the centre of pressure of the body. This is the point on the longitudinal axis of the body through which the air load force acts when the body is in an air stream in motion relative to the body in a direction inclined to the longitudinal axis. The centre of pressure can be found, for instance, by placing the body in a gimbal mounting in a constant air stream set up in a wind tunnel or otherwise, and shifting the body in its mounting until it just loses a tendency to head into the stream and is in neutral equilibrium. If the body is to travel nose first in stable equilibrium when no propulsive force is acting, the centre of gravity must be in front of the centre of pressure, and this is the case in all bodies according to my invention. It is because the centre of pressure is not coincident with the centre of gravity, that the turning point is variable in position.

If the propulsive force causes no acceleration, then the body moves through the air as in the air stream above and the turning point is at the centre of pressure. But if the force is sufficient to cause acceleration, then the turning point is displaced from the centre of pressure towards, but never beyond, the centre of gravity, to an extent determined by the acceleration and the speed of the body. The centre of pressure being, in bodies, according to my invention, behind the centre of gravity, the turning point is also behind the centre of gravity.

It is possible, given the centre of gravity, the centre of pressure, and information on the speed and acceleration of the body throughout the time a propulsive force is acting on it in flight, to determine by aerodynamical analysis the small longitudinal range of the positions which the turning point assumes during flight.

I construct bodies according to the present invention so that the point of convergence lies behind, but not more than a short distance behind, the turning point. The reasons for this can be explained by reference to drawings and in the accompanying drawings:

FIGURE 1 is an elevation of one aerial missile constructed according to the present invention;

FIGURE 2 is a longitudinal section through part of the missile on a larger scale.

Figure 3:
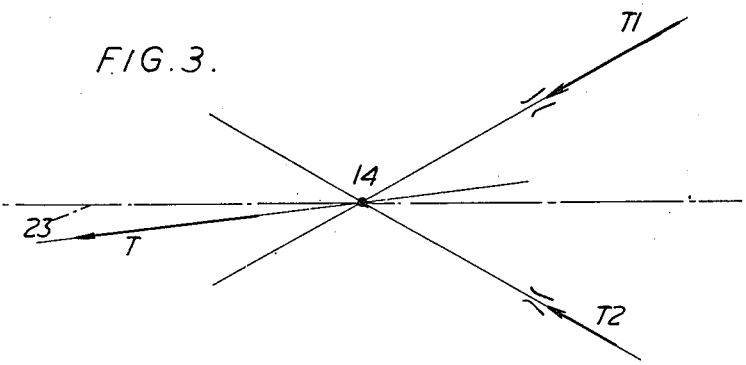
FIGURES 3 to 7 are diagrams to explain the operation.

Referring first to FIGURES 1 and 2, the missile shown is intended to be shot from a gun-like apparatus. It comprises a head 2 with a diaphragm 3 which divides the head into front and rear parts. The forward part of the head contains an explosive charge 8 with a fuse in a nose 20. The rear part is made as a pressure vessel which houses a cordite propellant 10 disposed around the forward end of a tube 4. This tube extends rearwardly from the head as a tail tube and at its rear end carries a stabilizing tail 6 of drum shape slightly divergent rearwards. The tube 4 is of a substantial length and, when the missile is to be shot off, the tube, together with the tail 6, is introduced into the barrel of the gun apparatus, fitting over a rod-like spigot which is not shown. At the forward end of the tube, there is a charge 9 which is fired by forward movement of the spigot. The firing of this charge produces a forward thrust on the missile, which is thus launched from the apparatus with an initial velocity. At the same time, flaming gas from the charge 9 passes through holes 11 and ignites powder 13 housed in a groove in the cordite propellant 10. The propellant 10 itself is thus ignited and thereafter burns to produce gas and set up a reaction thrust by which the missile is propelled and further accelerated.

In place of a spigot which is part of a gun, use may be made of a spigot which fits within the tail tube and carries a gas check at its rear end, the launching charge being housed between the gas check and a cartridge case. The spigot and gas check are jettisoned from the missile by rising pressure within the missile shortly after the missile leaves the gun from which it is discharged.

The gas is discharged through fourteen nozzles 12 symmetrically arranged around the rear of the head 2. Other numbers of nozzles may alternatively be provided. The nozzles define paths for the gas inclined to the axis of the missile and lying in a cone with its apex at a point 14, which is the point of convergence. The nozzles are each convergent-divergent with a reduced flare at the outlet. This shape is chosen to direct the gas with more precision in the designed direction that a normal convergent-divergent nozzle.

Figure 7:
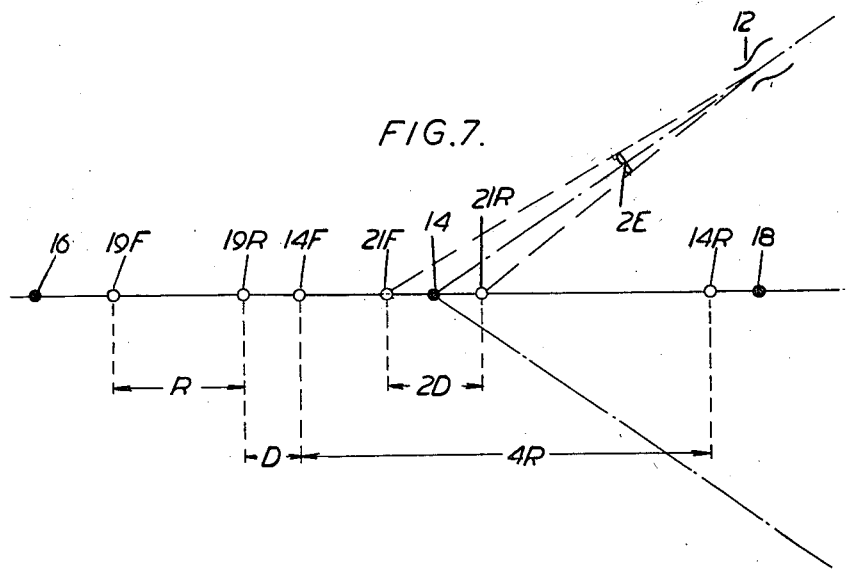

FIGURE 7 is an enlarged diagram, not to scale, of points along the longitudinal axis. The centre of gravity, which can, of course, easily be determined, is at a point 16 which, in the missile shown in FIGURE 1 and preferably in other bodies also, lies in the first third of the lateral area of the body. The centre of pressure is indicated at 18. In practice the fuel of this missile becomes fully ignited just after launching, and then burns steadily until it is abruptly exhausted at an intermediate point in the flight of the missile. From launching until this intermediate point is attained, the turning point remains considerably forward of the centre of pressure owing to the acceleration which is maintained until the fuel is exhausted. Thereafter the thrust ceases and so no further errors due to it can arise. The final deviation of the missile from its target does, however, depend on how far further it has to travel from the intermediate point in its flight. The limits of the range of positions of the turning point are indicated at 19F and 19R. As the fuel burns, the mass of the missile decreases, and the centre of gravity 16 may vary in position, but in the missile shown, in which the fuel 10 is disposed around the point 16, the position of the point is little affected by the expenditure of fuel. In order to maintain the centre of gravity in front of the centre of pressure, and the turning point in front of the point of convergence, it is always necessary to so design the whole missile and stow the fuel that the centre of gravity does not move too much aft as the fuel burns.

The missile is designed so that the resultant thrust will coincide with the longitudinal axis, that is, the nozzles are symmetrical around that axis. In practice, however, various types of error may arise as illustrated in FIGURES 3 to 6. In each figure, two nozzles only are shown by way of illustration. The gas discharge from these nozzles give rise to thrusts $T_1$ and $T_2$ which have a resultant T. In the absence of inaccuracies $T_1$ and $T_2$ are equal in magnitude, are equally inclined to the longitudinal axis 23, and intersect at the designed convergence point 14 on the longitudinal axis.

Figure 4:
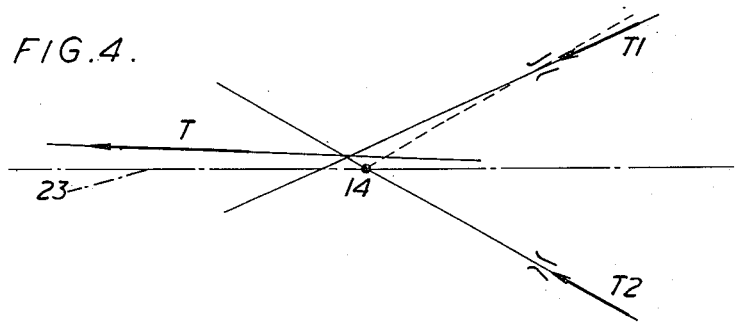
Figure 5:
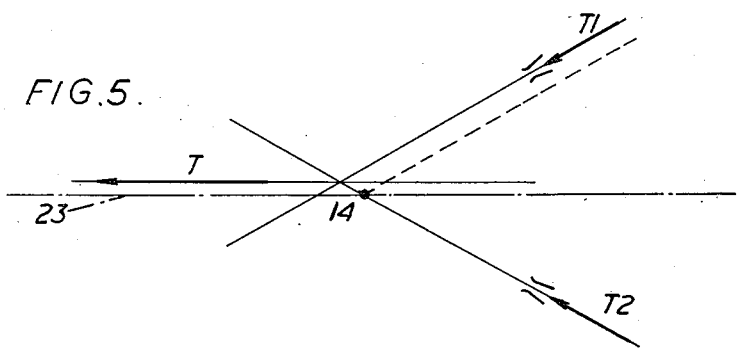

In FIGURE 3, $T_1$ has an error of magnitude while being in the correct position and at the correct inclination. This error may arise from irregular burning of propellant or from the nozzle being over size. As a result, T is inclined to the longitudinal axis, but still passes through 14. In FIGURE 4, $T_1$ has an error of inclination and, as a result, T is both slightly inclined and slightly displaced from 14. In FIGURE 5, $T_1$ has an error of position and, as a result, T is slightly displaced from the longitudinal axis, and hence from 14. The errors in FIGURES 4 and 5 may arise either from malalignment of a nozzle or from irregular flow through it. Several errors may, of course, be superimposed. The errors may be constant throughout flight or may fluctuate. This possibility of fluctuation, allied with the differing types of the errors makes it impossible to suppress completely the effect of the errors.

Figure 6:
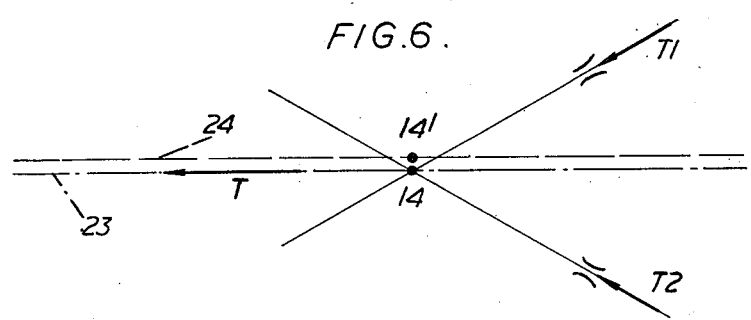

There is also the possibility that the centre of gravity or centre of pressure or both will not, in fact, lie precisely on the designed longitudinal axis. This will mean that, as shown in FIGURE 6 the actual longitudinal axis, which is a line 24 joining these points, will not necessarily pass through the point of convergence 14. Thus, T will have a moment about a point 14' which lies on the line 24 abreast the point 14. It is necessary to consider what order of magnitude each of these types of error may have in practice. I have found that the most significant type of error is one of magnitude such as is illustrated in FIGURE 3. The principal cause is probably a tendency for the rate of burning to vary over the surface of the propellant so that the rates of gas generation near each nozzle are not quite equal. Indeed as a consequence of the nozzles being well forward of the tail, errors of inclination such as are illustrated in FIGURE 4 no longer have the prime importance which they have in a missile with gas discharge from the end of the tail. Errors such as are illustrated in FIGURES 5 and 6 can be kept very small indeed by care in manufacture.

Now, starting from a condition in which the body has no angular velocity and no lateral velocity, it is possible for a lateral component of thrust to impart to the body a lateral movement, in other words, a drift, without simultaneously imparting any angular movement, in other words, any turning. This will occur if the thrust passes through the turning point (as determined by the instantaneous linear velocity and acceleraton). If the thrust passes through a point a small distance behind the turning point, then the body will both drift transversely and turn in a direction to counteract that drift.

In a vertical plane the effect of any errors is superimposed, not on a designed straight path, but on a designed curved path determined by the force of gravity in addition to the designed thrust, the mode of launching and the effect of the air load force.

Briefly, the underlying idea of the invention is the arrangement of all four points (the centre of gravity, the turning point, the point of convergence and the centre of pressure), so that any resultant turning moment and transverse component of thrust arising from lack of symmetry of the thrusts derived from the gas flowing along the paths will cause deflections, due respectively to turning of the body and drift of the body, that tend to counteract one another and are of comparable orders of magnitude.

This is a theoretical ideal which cannot be literally translated into practice because of the fact that the errors may be of a random and fluctuating nature. The accuracy of flight declines progressively as the ideal is departed from. I find that, based on this theoretical ideal, a high degree of accuracy of flight is obtainable if the convergence point is within a longitudinal range of positions determined with reference to the longitudinal range of positions of the turning point (as herein defined) when the body is accelerating clear of any projector and with reference to the distance subtended along the longitudinal axis by the range of inclination through which any one of the paths of discharge of fluid may waver due to random fluctuations in discharge.

In FIGURE 7, 21F to 21R is the distance 2D subtended along the longitudinal axis by the range of inclination 2E which can be observed by high speed photography of the discharge from a nozzle.

The forward limit 14F of positions of the convergence point is D behind 19R, the rearward limit of positions of the turning point. The magnitude of the range of positions of the convergence point from 14F to 14R is four times the magnitude of the range of positions of the turning point from 19F to 19R.

The figure "four times" is not a critical limit but is a practical arbitrary limit separating less satisfactory positions from the most satisfactory positions. Both ranges are very small compared with the length of the missile.

In constructing any other missile or other body, it is, of course, possible to determine the centre of pressure and also a small zone within which the centre of gravity will lie. It is then possible to determine the range of positions of the turning point for a particular mode of launching and designed thrust. It is best to use theoretical analysis only to give an approximate position for the point of convergence and then to find the optimum position by simple experiment. This will involve preparing a small number of batches of missiles with the point of convergence in a slightly different position in each batch. The different positions are most readily obtained by varying the inclination of the nozzles to the axis, which will have the effect of varying the position of the apex of the cone in which the nozzles lie. The dispersion of each batch on firing is measured, and the dimensions of the batch giving the least dispersion are noted for future use. Missiles and other bodies can be made in so many shapes and sizes that for a particular new shape and size this form of experiment will generally be found more rapid than elaborate theoretical calculation.

A secondary result of a difference in direction or amount of the gas discharges from nozzles on opposite of the body will be that two opposite parts of the tail stabilizer (assumed symmetrical about the longitudinal axis of the body) will lie in parts of the slipstream (being the combination of the air flow past the body and the effluent from the nozzles) which are not symmetrical about the longitudinal axis of the body. As one result the two opposite parts of the tail stabilizer will experience air forces the transverse components of which are not equal and opposite. The difference will exert little effect on drift, but owing to its large moment arm may exert an appreciable effect on turning. This effect will be superimposed on the turning effect due to the asymmetry of the thrusts from the nozzles. The stabilizer may either agument or diminish the total turning effect according to the angle of the stabilizer surfaces to the axis of the body and the position of the stabilizer relative to the nozzles. In experiment this secondary result will automatically be allowed for.

The angle of the stabilizer surfaces to the axis of the body also determines the drag exerted by the stabilizer and a compromise must be made between achieving a small drag while the fuel is burning, achieving a small drag after the fuel is expended, and exerting whatever influence may be desirable on the turning effect produced by a given error in gas discharge.

If a drum-type stabilizer is not desired, it may be possible to dispense entirely with a tail stabilizer, or to replace it by a bulbous or conical enlargement at the tip of the tail tube. This may be less than half the diameter of the main body.

If the tail of a missile is larger in proportion to its body than the tail of the missile shown in FIGURE 1, then the centre of pressure may be further aft, and the centre of gravity may also be further aft. However, in all missiles according to the invention, the point of convergence lies forward of the last quarter of the area of the missile in side elevation.

As an alternative to a ring of nozzles 12, the gas may be discharged through an annular passage which encircles the missile and is only interrupted by thin radial webs. This enables the same flow area to be obtained in a smaller overall diameter.

In the constructions shown in the figures, a solid propellant is used. As an alternative, the propellant may be liquid, which may or may not require oxygen to support its combustion. The source of gas may be a ram jet. Gas may be discharged in a succession of pulses rather than continuously. A liquid fuel may be stored some distance from the nozzle or nozzles, for example, in the nose of a missile with a hollow charge, and conveyed by a pipe to a point of combustion.

Moreover, the invention is equally applicable to bodies which are not given an initial velocity by a launching charge but are accelerated from rest solely by any form of reaction propulsion.

The means described above for compensating for inaccuracies are of especial value in bodies which do not rotate about their longitudinal axis in transit. They are also applicable to missiles which have a slow rotation and which, in the absence of the invention, would tend to follow a helical path. The slow rotation may be caused deliberately by rifling or by inclination of the nozzles or of tail surfaces. Moreover, a slight rotation may be caused by errors in gas discharge, but this is not harmful. The invention is not, however, applicable to bodies which are given a rotation so rapid as to have a gyroscopic stabilizing effect, since the problems with which the invention deals do not arise with bodies which are given a rapid rotation. Missiles having a hollow charge are not generally given a rapid rotation since this interferes with the successful use of the hollow charge. If these missiles are fitted with lateral wings, they are given no deliberate rotation but if they are fitted with a tubular sustaining member, they may be given slow rotation, and in either case, the invention may be applied to them.

I claim:

1. An elongated body for travel through a fluid medium, the body having a forward end, a rearward end, a center of gravity, a center of pressure, a longitudinal axis, and a turning point; the center of pressure being that single point through which, if the body is placed in a stream of the fluid medium flowing rearwardly relatively to the body and the body is variously inclined to the stream, the force on the body due to the stream will continue to act, the longitudinal axis being a straight line through the center of gravity and the center of pressure, and the turning point being that point on the longitudinal axis through which any oblique propulsive force must act to impart rectilinear motion to the body; the body having the center of gravity forward of the center of pressure, the turning point being consequently in a position in a range having a forward limit rearward of the center of gravity and a rearward limit forward of the center of pressure; and the body containing a source of fluid propellant which can be discharged rearwards to propel the body, and means defining paths for the discharge of the propellant, said paths diverging rearwardly from one another substantially symmetrically about the longitudinal axis of the body, the paths leaving the body at a substantial distance in front of the rearward end thereof, the projection of the axes of the paths forming by their meeting a point of convergence on the longitudinal axis of the body; the point of convergence being rearward of the rearward limit of the range of the position of the turning point, and forward of the center of pressure.

2. An elongated body for travel through a fluid medium, the body having a forward end, a rearward end, a center of gravity, a center of pressure, a longitudinal axis, and a turning point; the center of pressure being that single point through which, if the body is placed in a stream of the fluid medium flowing rearwardly relatively to the body and the body is variously inclined to the stream, the force on the body due to the stream will continue to act, the longitudinal axis being a straight line through the center of gravity and the center of pressure, and the turning point being that point on the longitudinal axis through which any oblique propulsive force must act to impart rectilinear motion to the body; the body having the center of gravity forward of the center of pressure, the turning point being consequently in a position in a range having a forward limit rearward of the center of gravity and a rearward limit forward of the center of pressure; and the body containing a source of fluid propellant which can be discharged rearwards to propel the body, and means defining paths for the discharge of the propellant, said paths diverging rearwardly from one another substantially symmetrically about the longitudinal axis of the body, the paths leaving the body at a substantial distance in front of the rearward end thereof, the projection of the axes of the paths forming by their meeting a point of convergence on the longitudinal axis of the body; the point of convergence being rearward of the rearward limit of the range of the position of the turning point by a distance greater than half the wavering distance, but less than the sum of half the wavering distance and four times the length of the range of the position of the turning point, the wavering distance being the distance subtended along the longitudinal axis by the range of inclination through which the flow of fluid propellant along any one of the paths will be found to waver due to random fluctuations in discharge.

3. An elongated body for travel through a fluid medium, the body having a forward end, a rearward end, a center of gravity, a center of pressure, a longitudinal axis, and a turning point; the center of pressure being that single point through which, if the body is placed in a stream of the fluid medium flowing rearwardly relatively to the body and the body is variously inclined to the stream, the force on the body due to the stream will continue to act, the longitudinal axis being a straight line through the center of gravity and the center of pressure, and the turning point being that point on the longitudinal axis through which any oblique propulsive force must act to impart rectilinear motion to the body; the body having the center of gravity forward of the center of pressure, the turning point being consequently in a position in a range having a forward limit rearward of the center of gravity and a rearward limit forward of the center of pressure; and the body containing a source of fluid propellant which can be discharged rearwards to propel the body, and means defining paths for the discharge of the propellant, said paths diverging rearwardly from one another substantially symmetrically about the longitudinal axis of the body, the paths leaving the body at a substantial distance in front of the rearward end thereof, the projection of the axes of the paths forming by their meeting a point of convergence on the longitudinal axis of the body; the point of convergence being rearward of the rearward limit of the range of the position of the turning point, and forward of the last quarter of the area of the body in side elevation.

References Cited in the file of this patent
UNITED STATES PATENTS

| | | |
|---|---|---|
| 2,489,953 | Burney | Nov. 29, 1949 |
| 2,503,271 | Hickman | Apr. 11, 1950 |